June 2, 1959     B. R. BETTER     2,888,848
CAM AND PIN TYPE MANDREL OR CHUCK
Filed Oct. 10, 1955
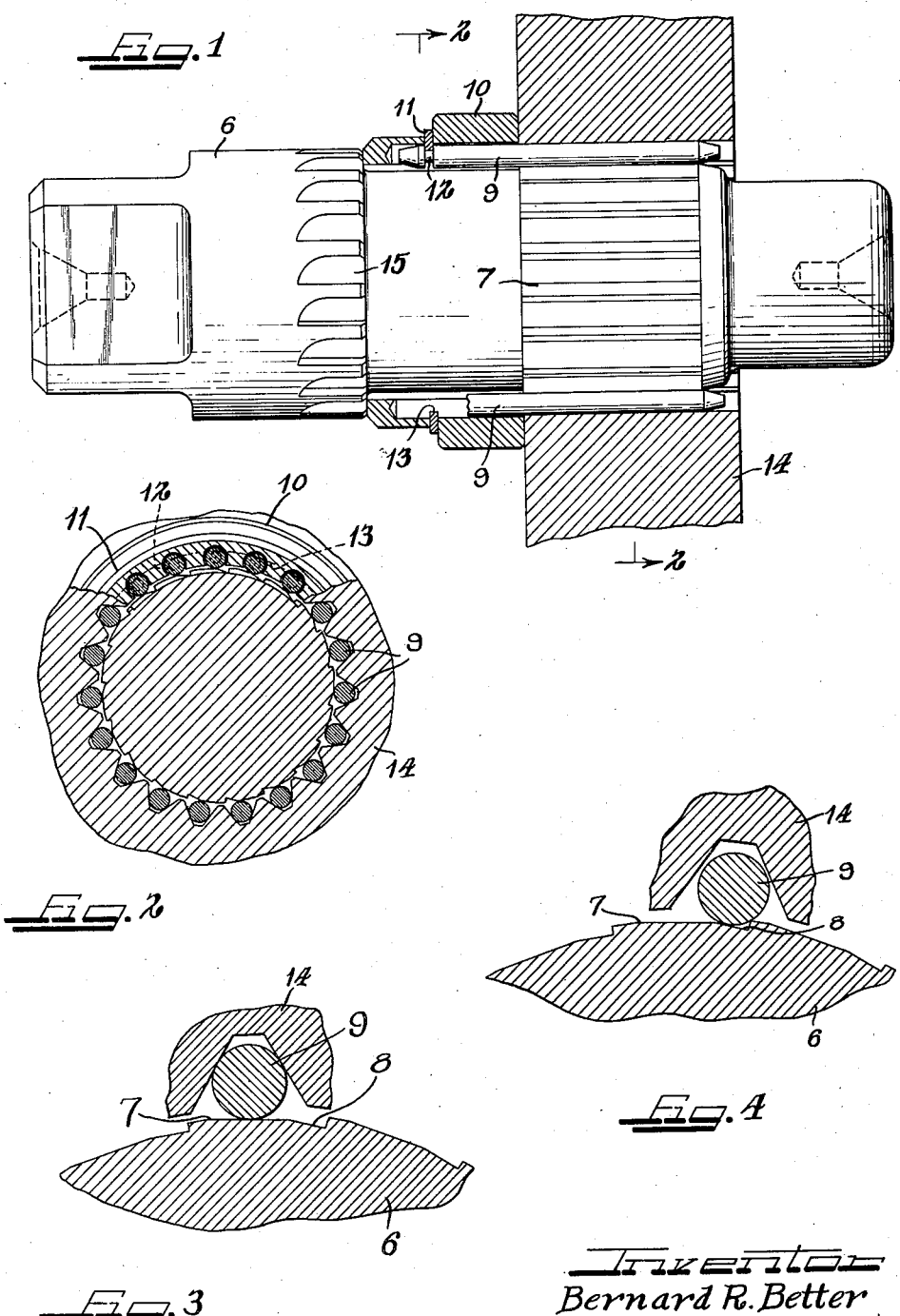
Inventor
Bernard R. Better
Glenn S. Noble
Atty.

United States Patent Office 2,888,848
Patented June 2, 1959

2,888,848

CAM AND PIN TYPE MANDREL OR CHUCK

Bernard R. Better, Chicago, Ill., assignor to Scully-Jones and Company, Chicago, Ill., a corporation of Illinois Application October 10, 1955, Serial No. 539,566

1 Claim. (Cl. 82—44)

This invention relates particularly to chucks or holding devices for holding work pieces such as gears or the like, for finishing operations.

The objects of this invention are to provide a chuck of this character having means such as pins or rollers for engagement with the teeth of a gear and more particularly for holding the same near the pitch diameter of the gear.

It also provides means whereby the workman may quickly centralize the gear on its pitch diameter to perform machining operations on the bore or other accessible surfaces with the assurance that these surfaces will be very accurately located with respect to the pitch diameter.

Another object is to provide a method of chucking a gear so that if there are high points on one or two of the teeth or if the gear has become warped by heat treating, such errors or deformations will be automatically averaged by the action of the pins and the pitch diameter will be centrally located in the most accurate position. This permits reductions in grinding allowances within the bore of the gear on other surfaces.

Other advantages are the simplicity of manufacture of the chuck and also its simplicity and efficiency in operation and it may be quickly disassembled for cleaning to remove chips or other foreign matter if necessary.

In the accompanying drawings showing a preferred form of my invention, Fig. 1 is a side view of the chuck shown as supporting or in engagement with a gear work piece, parts being shown in section for convenience in illustration.

Fig. 2 is a sectional view taken substantially on the line 2—2 of Fig. 1.

Fig. 3 is an enlarged detail showing the driving cams with the roller in driving position in the gear.

Fig. 4 is a view similar to Fig. 3 showing the pin or roller in releasing position.

My improved chuck consists of a mandrel or a driving member 6 provided with any suitable means for attaching it to a machine tool. The mandrel or arbor is provided with a plurality of circumferentially arranged longitudinal flats or cams 7 spaced equally around the periphery and is provided with slight depressions 8 adjacent to the flats as shown in Fig. 3. The pins or rollers 9 which coact with the driving member 6 are loosely held in a pin cage 10 which is mounted on the arbor adjacent to the flats. These slots are positioned so that their inner portions will partially break through the inside diameter of the cage and permit the pins to protrude slightly into the cage, while still being restrained in the slots. The pins are held against longitudinal movement by a retaining ring 11 which engages peripheral grooves 12 adjacent to the ends of the pins or rollers 9, and with a groove 13 in the roller cage, the spring ring rests against the shoulder at the end of the cage as shown. The ends of the pins or rollers are tapered as shown to facilitate their being assembled and also for loading or insertion in the work piece such as the gear 14.

When the mandrel is to be used for turning a gear or work piece, the pins are rotated with respect to the driving member 6 until they enter the various clearance recesses 8 as shown in Fig. 4. Then upon relative rotation of the gear or work piece and the driving member, the rollers will be forced outwardly by the cams or flats into engagement with the teeth of the gear as shown particularly in Figs. 2 and 3. Thereupon the gear may be subjected to such operations as desired.

Upon completion of the work, the gear is moved relatively to the driving member until the rollers again reach the non-driving positions and the gear may be readily removed from the mandrel. The arrangement may be such that there is a pin for each space between the gear teeth or if desired, a lesser number may be used to accomplish the desired results.

It will also be noted that a driving force on the pins or rollers will tend to tighten the connection of the gear as it is being worked upon. If gears with external teeth are to be operated upon, the arrangement will be substantially the same with the exception that the rollers will be arranged around the outer periphery of the gear and the flats or suitable camforms will be arranged in a coacting ring or driving member as will be readily understood.

The mandrel 6 is provided adjacent to the pin carrying portion with cuts or saw teeth 15 to provide a ratchet for assistance in the manufacture of the mandrel, but which does not serve any function when the mandrel is used.

Having thus described my invention, what I claim is:

In a chuck for turning gears upon which work is to be done, in combination, a mandrel, means for attaching the mandrel to a machine tool, said mandrel having a plurality of circumferentially arranged longitudinal cams spaced equally around the periphery and being provided with slight depressions adjacent to the cams, rollers arranged longitudinally of the mandrel and adapted to coact with said cams for projecting them for engagement with the teeth of a gear work piece, a cage on the mandrel adjacent to the cams having longitudinal slots positioned so that their inner portions will partially break through the inside diameter of the cage, said rollers engaging with said slots and of sufficient diameter so that they will be restrained in the slots, a retaining ring engaging with peripheral grooves in the rollers and with a groove in the roller cage for holding the rollers against longitudinal movement, the arrangement being such that the gear to be worked upon may be readily positioned over the rollers which rollers will assume substantially the pitch diameter of the gear to insure proper alignment of the portion of the gear worked upon with the pitch diameter of the gear.

References Cited in the file of this patent

UNITED STATES PATENTS

| | | |
|---|---|---|
| 249,143 | Cottrell | Nov. 1, 1881 |
| 1,021,011 | Sponable | Mar. 26, 1912 |
| 1,050,575 | Stryhal | Jan. 14, 1913 |
| 2,463,156 | Day | Mar. 1, 1949 |
| 2,511,954 | Telfor | June 20, 1950 |
| 2,652,738 | Carlson | Sept. 22, 1953 |
| 2,665,136 | Fallon | Jan. 5, 1954 |
| 2,683,606 | Coleman | July 13, 1954 |

FOREIGN PATENTS

| | | |
|---|---|---|
| 101,008 | Norway | Mar. 4, 1941 |
| 232,962 | Switzerland | Oct. 16, 1947 |
| 354,417 | Italy | Nov. 22, 1937 |
| 386,435 | Great Britain | Jan. 19, 1933 |